(12) United States Patent
Staheli (10) Patent No.: US 7,350,347 B2
(45) Date of Patent: Apr. 1, 2008

(54) CROP RAKING DEVICE

(76) Inventor: David H. Staheli, 1280 W. 3695 North, Cedar City, UT (US) 84720

( * ) Notice: Subject to any disclaimer, the term of this patent is extended or adjusted under 35 U.S.C. 154(b) by 115 days.

(21) Appl. No.: 10/893,128

(22) Filed: Jul. 16, 2004

(65) Prior Publication Data

US 2006/0021321 A1 Feb. 2, 2006

(51) Int. Cl.
*A01D 84/00* (2006.01)
(52) U.S. Cl. .............................. 56/396; 56/380; 56/384
(58) Field of Classification Search ................. 56/377, 56/380, 384, 396; 172/29, 239, 397
See application file for complete search history.

(56) References Cited

U.S. PATENT DOCUMENTS

| | | | |
|---|---|---|---|
| 2,220,172 A | 11/1940 | O'Dowd | |
| 2,472,260 A | 6/1949 | Morrill | |
| 2,532,652 A * | 12/1950 | Wray, Sr. .................. | 56/377 |
| 2,727,351 A | 12/1955 | Plant | |
| 2,796,723 A * | 6/1957 | Smith et al. ............... | 56/377 |
| 2,811,009 A | 10/1957 | Plant | |
| 2,816,414 A * | 12/1957 | Van Der Lely et al. ...... | 56/377 |
| 2,836,030 A * | 5/1958 | Van Der Lely et al. ...... | 56/377 |
| 2,861,413 A * | 11/1958 | Van Der Lely et al. ...... | 56/377 |
| 2,925,700 A * | 2/1960 | Moore ....................... | 56/15.5 |
| 2,933,878 A * | 4/1960 | Van Der Lely et al. ...... | 56/377 |
| 3,006,133 A * | 10/1961 | Van Der Lely et al. ...... | 56/377 |
| 3,050,926 A * | 8/1962 | Van Der Lely et al. ...... | 56/377 |
| 3,220,172 A | 11/1965 | Wood | |
| 3,377,788 A | 4/1968 | Pickrell | |
| 3,690,055 A * | 9/1972 | Reber ........................ | 56/370 |
| 4,785,614 A | 11/1988 | Schoenherr | |
| 4,944,141 A | 7/1990 | Orlando et al. | |
| 4,996,833 A | 3/1991 | Von Allowerden | |
| 5,305,590 A | 4/1994 | Peeters | |
| 5,502,959 A | 4/1996 | Hansen | |

* cited by examiner

*Primary Examiner*—Thomas B. Will
*Assistant Examiner*—Jamie L McGowan
(74) *Attorney, Agent, or Firm*—Thorpe North & Western LLP (57) ABSTRACT

A crop raking device includes a rake wheel and a gauge wheel. The rake wheel is configured to rake crop in a field, with teeth disposed around a perimeter thereof, and has a vertically variable position. The gauge wheel is attached to the rake wheel, and is configured to contact ground behind the rake wheel and maintain a height of the rake wheel teeth with respect to the ground. The gauge wheel is configured to maintain a substantially constant upright orientation regardless of the vertical position of the rake wheel.

31 Claims, 7 Drawing Sheets

CROP RAKING DEVICE

BACKGROUND OF THE INVENTION

1. Field of the Invention

The present invention relates generally to agricultural equipment. More particularly, the present invention relates to a crop raking device that maintains a more consistent position with respect to the ground.

2. Related Art

In typical hay and forage operations, harvest practices become the determining factor as to whether a valuable crop standing in the field will still be valuable when it is in the barn, in the stack, in the silage bag, pit or silo, or in the manger where it is used as feed. Each component of the harvest procedure presents challenges, and each, if handled improperly, poses the risk of seriously devaluing the end product on which the producer depends.

In silage operations various forages are cut green into windrows. Two or more windrows are raked together to create a larger windrow which will satisfy the appetite of modern high capacity forage harvesters. In nearly all dry hay and forage operations, the crop is cut green and then allowed to dry for a period of time. When sufficient drying has occurred, the hay or forage is then inverted for further drying or two or more windrows or swaths of crop are gathered into one larger windrow for further drying and/or to accommodate the next harvest operation of baling, dry chopping, cubing or palletizing.

While great progress has been made in the technologies contributing to hay and forage harvesting, there are still areas that need improvement. In very recent years, raking has become a much more critical component of hay and forage harvesting because the more lucrative markets are demanding cleaner product. Rocks, dirt clods, soil particles, and other debris and contaminants in hay and forage products significantly reduce sales or seriously reduce the price producers can obtain for their product. These contaminants can be introduced into forages during various operations of the harvest. However raking is where most forage contamination occurs. When rake teeth or other portions of a raking device dig into the soil, rather than staying above it, they introduce these contaminants into the forage.

One forage raking system that is relatively effective in minimizing contamination of forage is the basket rake. Basket rakes generally place one or more ground-contacting wheels relatively close to the raking area of the machine, which usually maintains a reasonable operating clearance above the ground. The system is probably the most effective in maintaining a consistent operating height or depth. However, basket rakes are generally considered to be too slow in the commercial hay industry. Consequently, the rake market has moved heavily toward the much faster, but dirtier, wheel rake.

The current design of wheel rakes requires a delicate balance between trying to effectively gather cut hay swaths or windrows (without leaving valuable crop in the field), while trying to keep the rake teeth out of the soil. It is difficult to maintain optimum raking accuracy because large modern wheel rakes cover swaths as wide as 40 feet or more, with operating lengths up to 30 feet. At any given time, within the length and breadth of such an operating area, there can be large enough variations in the field elevation to cause either undesirable contact between the rake teeth and the soil surface, or excessive rake tooth operating height in other locations.

There have not been many significant technological advancements in hay and forage raking for many years. Indeed, until recently, market forces have not particularly focused on the problem of contaminated forage, and players in the market have not complained too loudly about this problem. However, this appears to be changing due to a variety of market forces. Export markets are becoming particularly sensitive to contamination of forages with soil or other soil-borne products because of the perceived risk of biological contamination of their native soils with soil-borne organisms from other countries. Additionally, equipment maintenance is also affected by poor raking performance. Rake teeth are very expensive, and wear out quickly when they frequently contact a soil surface. Furthermore, machinery used in other operations, such as machinery for subsequent harvest operations, bearings, cutting knives, pellet and hay cube dies etc., also wears at an accelerated rate when abrasive soil or aggregate substances are present in the forages they process.

Some attempts have been made within recent years to resolve these problems. Currently the most common method of controlling the operating height or depth of wheel rakes includes the use of flotation springs. These are designed to lighten each individual rake wheel so that when the rake teeth mounted on the outside circumference of the rake wheel contact the soil surface during operation, they do not dig heavily into the soil but will scuff the soil only an inch or two deep upon contact. Unfortunately, this scuffing action is sufficient to dislodge small rocks, gravel, small soil clods, soil particles and other debris, and to propel a portion of these into the forage being raked.

Additionally, if an operator does not adjust the wheel rake regularly, the contact between the rake teeth and the soil can become excessive causing excessive wear and/or breakage of the rake teeth and excessive contamination of the forage being raked. Thousands of tons of forage can be contaminated relatively quickly with poor rake performance.

Another recent attempt to improve wheel rake performance has been to install depth bands on wheel rake systems. These bands are connected to the outer circumference of the rake wheels between each pair of rake teeth in either a loop shape or a "J" shape. If adjusted properly, depth bands provide a depth stop which allows the rake teeth to operate very close to the soil surface without letting the teeth actually penetrate the soil. Rake wheels equipped with these depth bands are also typically suspended with flotation springs to lighten the contact of the depth bands with the soil surface.

Depth bands can work reasonably well in certain soil conditions. However, significant contamination problems still exist in soft soils and sandy soil because the depth bands themselves, being relatively narrow (e.g. about 1 inch wide) can fairly easily penetrate these soil types, allowing both the depth band and the rake teeth to throw soil particles into the forage being raked. There have been reports by owners of these rake systems that the depth bands and the rake teeth both readily move gravel and small rocks into forage.

SUMMARY OF THE INVENTION

It has been recognized that it would be advantageous to develop a rake wheel system that more consistently reduces the introduction of contaminants into forage.

It has also been recognized that it would be advantageous to develop a wheel rake system that maintains the height of a rake wheel above the ground in a variety of conditions, and which is simple in design It has also been recognized that it would be advantageous to develop a wheel rake height maintenance system that can be easily retrofitted onto existing wheel rakes.

The invention advantageously provides a crop raking device, including a rake wheel and a gauge wheel. The rake wheel is configured to rake crop in a field, with teeth disposed around a perimeter thereof, and has a vertically variable position. The gauge wheel is attached to the rake wheel, and is configured to contact ground behind the rake wheel and maintain a height of the rake wheel teeth with respect to the ground. Moreover, the gauge wheel is configured to maintain a substantially constant upright orientation regardless of the vertical position of the rake wheel.

In accordance with a more detailed aspect thereof, in one embodiment the gauge wheel comprises a caster, having a caster shaft, configured to trail behind the rake wheel. The caster is interconnected to an axle of the rake wheel via a linkage that is configured to maintain the caster shaft in a substantially vertical orientation regardless of the vertical height or position of the rake wheel.

In accordance with another more detailed aspect thereof, in one embodiment the gauge wheel comprises a rim, rearwardly concentrically extending from near a perimeter of the rake wheel. The rim is configured to rotate with the rake wheel, and is configured to contact the ground rearwardly of the rake wheel.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention reduces or eliminates the common problem of hay and forage contamination caused by modern wheel rakes. It also helps reduce rake tooth wear and wear to other components of the rake and other machinery used "downstream" in the hay and forage processing and consumption industry. It also increases forage quality and palatability. The disclosed method and devices herein described combine cleanliness with the operating speed of the wheel rake. The invention provides a system that helps prevent debris, such as soil, sand, and gravel, from contaminating hay or other forage while being raked into rows for drying. While the invention is illustrated with respect to a wheel rake system, it will be apparent that the invention is applicable to other types of harvesting equipment.

Figure 1:
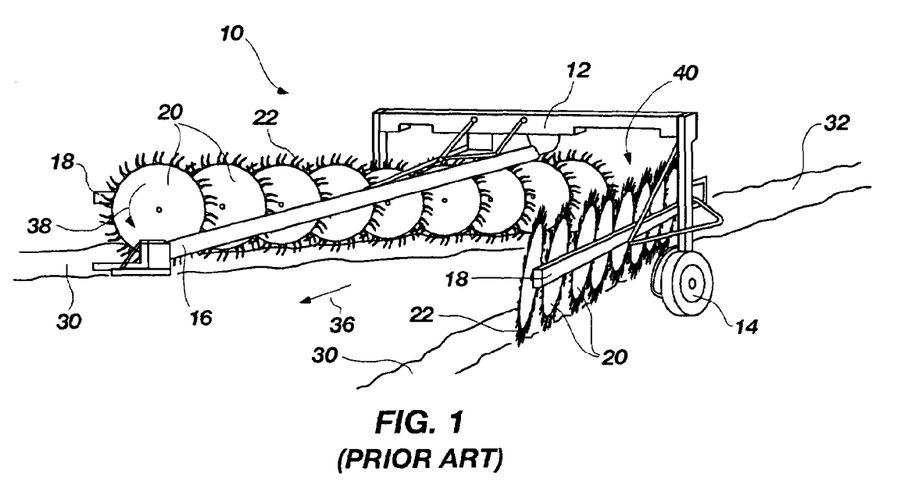
FIG. 1 is a perspective view of a prior art wheel raking device.
Figure 2:
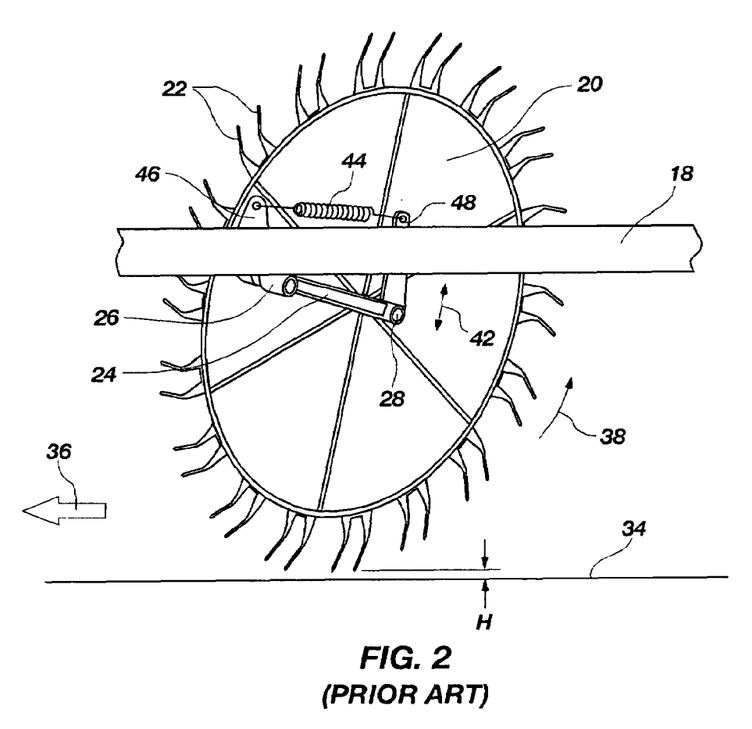
FIG. 2 is a close-up outside view of one wheel of the prior art wheel raking system of FIG. 1.

Shown in FIGS. 1 and 2 are views of a prior art hay raking device 10. This system generally comprises a transverse frame 12 with support wheels 14 and a tongue 16 for connecting to a tractor or other towing vehicle (not shown). Extending from the transverse frame are twin booms or rake frames 18 that support a plurality of rake wheels 20, each rake wheel having a plurality of rake teeth 22 extending from its perimeter. Referring specifically to FIG. 2, attached along the rake frame are a plurality of rake wheel arms 24, each arm being pivotally attached via a hinge 26 to the rake frame, and having the rake wheel rotatably attached to the opposite end via a wheel hub 28.

The hay rake embodiment 10 shown in FIGS. 1 and 2 is designed to rake two or more laterally separated small windrows 30 of crop into a single larger windrow 32. For use in this way, the rake frames 18 are extended or spread laterally so as to span a distance encompassing the desired small windrows, with the rake wheels 20 disposed near the ground 34. The rake wheels are disposed at an angle relative to the direction of travel through the field (represented by arrow 36), so that forward motion of the hay rake device and towing vehicle will cause the wheels to rotate in the desired direction (represented by arrow 38) in response to contact with the crop. The rake wheels of a typical wheel raking system are also typically tilted backward slightly, as is apparent from the views of FIGS. 7A and 8A, rather than being in an exactly vertical plane. A common tilt angle is about 5° from vertical. The position of each rake wheel is behind and slightly inward of the preceding wheel (with respect to the direction of travel of the device), providing an overlap so that the teeth 22 of each rake wheel will sequentially contact and rake the crop, overturning and pushing the crop inwardly as the rake moves through the field. The rake wheels thus both turn the crop and move it toward the outlet space 40 in the center rear of the rake device. The result is a single larger windrow of crop that is mixed and turned over to allow further and more complete drying.

The pivotal rake wheel arms 24 allow the rake wheels 20 to move up and down, as represented by arrow 42, independently of the rake frame 18 in response to irregularities in the ground 34. The rake frame is supported by the support wheels 14 at laterally spaced locations. However, these support wheels cannot encounter or compensate for all irregularities in the ground across the full width of the rake machine. Furthermore, the support wheels can cause the rake frame to rock or bump as it is drawn across the ground, causing the height of the rake frames above the ground to vary. Consequently, the independent motion of the rake wheel arms is designed to help maintain a constant height of each rake wheel relative to the ground.

Unfortunately, the up and down motion of the rake wheels 20 in response to variations in the ground 34 can cause the rake teeth 22 to contact the ground and contaminate the crop with rocks, dirt, etc. As noted above, to help prevent this, prior wheel rake systems have employed various devices intended to reduce contact of the rake wheel with the ground while preventing the wheel from riding too high above the ground. Such devices include flotation springs, depth bands, etc. One configuration of a flotation spring-biased rake wheel is shown in FIG. 2. The flotation spring 44 is a tension spring that is connected at one end to a bracket 46 that is rigidly affixed to the rake frame 18, and at the other end to an arm 48 that is connected to the rake wheel hub 28. The force of the spring biases the rake wheel upwardly, and is intended to be adjusted so that at the desired rake wheel height the rake wheel has substantially neutral "buoyancy." In other words, the flotation spring configuration is intended to establish an equilibrium position between the weight of the wheel and the force of the spring that places the wheel at the desired height H of the rake teeth 22 above the ground.

Unfortunately, flotation springs do not adequately solve the problem of ground contact, and require regular adjustment. While the flotation spring may balance the rake wheel at the desired height when the device is not moving, the typical bumps, jolts, rocking and swaying of the rake device during use will inevitably cause the rake wheels to ride too high at times, and to scuff the ground at other times. Additionally, the flotation springs will tend to gradually lose their spring, and will thus require regular adjustment. Depth bands and other devices also have various disadvantages, which have been mentioned above.

Figure 3:
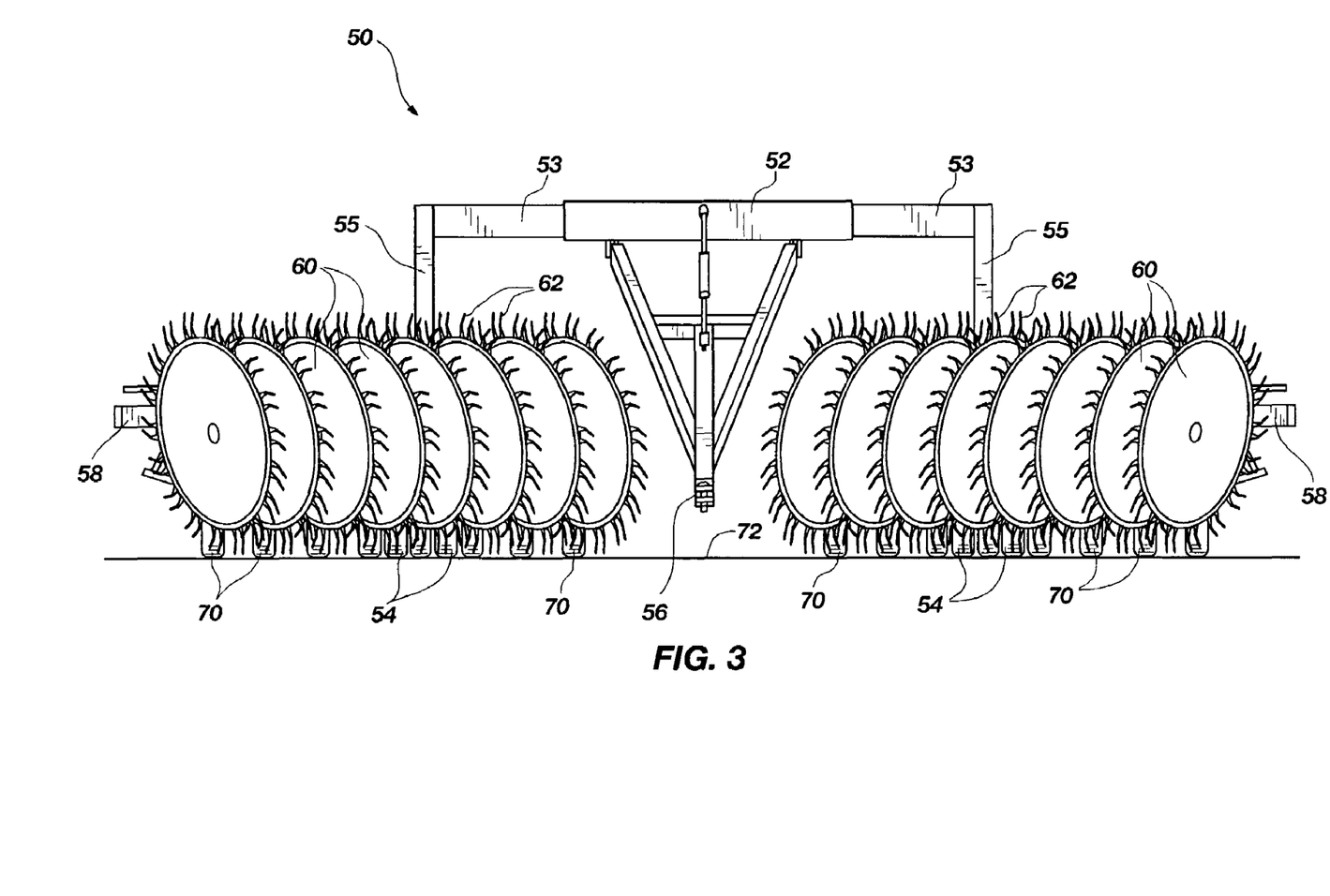
FIG. 3 is a front view of one embodiment of a wheel rake system in accordance with the present invention.
Figure 4:
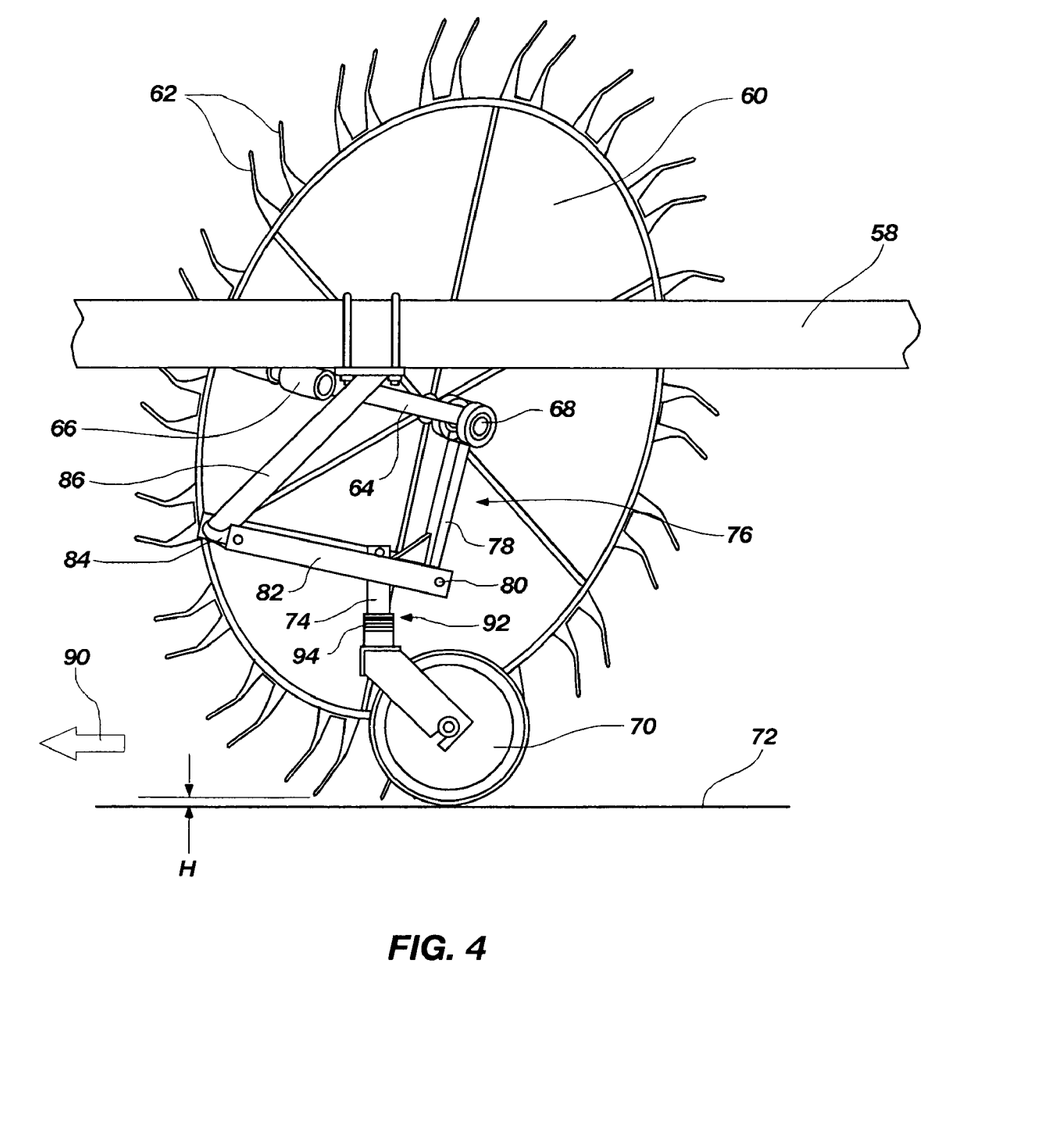
FIG. 4 is a close-up outside view of one wheel of the wheel rake system of FIG. 3 showing the gauge wheel and parallel linkage for maintaining clearance of the rake teeth.

Advantageously, the present invention provides a raking system that prevents contact of the rake wheel with the ground more effectively than prior devices. One embodiment of a hay raking device 50 according to the present invention is shown in FIGS. 3 and 4. Like the prior art, this system generally comprises a transverse mainframe 52 with support wheels 54 and a tongue 56 for connecting to a tractor or other towing vehicle. In the view of FIG. 3 the tongue protrudes forward toward the viewer and is configured to attach to a tractor or other suitable towing vehicle (not shown). Extending from the transverse frame are twin carrier beams or rake frames 58 that support a plurality of rake wheels 60, each rake wheel having a plurality of rake teeth 62 extending from its perimeter. The rake machine of FIG. 3 is shown in field operating position with the rake wheels lowered and the right and left rake wheel carrier beams turned approximately 45° from the direction of travel. In this position the rake is capable of raking a wide swath of hay into a single windrow, or two or more windrows of hay into a single larger windrow.

The overhead mainframe assembly 52 can comprise a pair of large square or rectangular horizontal tubes, one in front of the other, to which the tongue assembly 56 is attached. Each of the smaller right and left horizontal side tubes 53 can be configured to telescope in and out of the center tubes (e.g. via hydraulic actuation) to adjust the raking and windrow formation width. The right and left vertical tubes 55 extend downward from the horizontal tubes and each have the tires 54 mounted to their bottom ends. The overhead mainframe carries most of the weight of the machine during transport and field operation.

The right and left rake wheel carrier beams 58 are mounted directly to the right and left vertical tubes 55 of the overhead mainframe assembly. The rake wheel carrier beams are vertically stationary, but are horizontally rotatable from parallel to the direction of travel, outward as much as approximately 45° from the direction of travel. This rotational movement of these rake wheel carrier beams is usually accomplished by manual or hydraulic actuation.

Referring specifically to FIG. 4, attached along each carrier beam or rake frame 58 are a plurality of rake wheel arms 64, each arm being pivotally attached via a hinge 66 to the rake frame, and having the rake wheel rotatably attached to the opposite end via a wheel hub 68. Unlike the prior art, the hay raking device 50 includes a gauge wheel 70 that is connected to the hub 68 of each rake wheel 60. The gauge wheel supports the rake wheel at a set height H above the ground 72. A relatively small amount of weight is transferred to each gauge wheel during field operation. This allows the rake wheel/gauge wheel assembly to freely follow the contour of the ground without imposing excessive weight thereto. The gauge wheel is a caster type wheel that trails its associated rake wheel. The trailing distance (the distance between the effective points of ground contact of the rake wheel and gauge wheel, respectively) can vary, but a trailing distance of about 3" to 12" is anticipated, with a distance of 6" to 10" expected to be most common. The gauge wheel includes a caster shaft 74 that allows the wheel to pivot about a substantially vertical axis to maintain the proper rolling orientation, even if the direction of travel of the hay raking device or the angular orientation of the rake wheel changes.

The gauge wheel 70 is connected to the rake frame 58 via a gauge wheel linkage 76 that allows the caster shaft 74 and the gauge wheel to maintain a substantially vertical orientation at all times. The gauge wheel/caster shaft is fixedly attached to a lifting arm 78 of the gauge wheel linkage. This lifting arm is pivotally connected at its top end to the rake wheel hub 68, and pivotally connected at a pivot point 80 at its lower end to a lower arm 82 of the gauge wheel linkage. The other end of the lower arm is pivotally connected at a pivot point 84 to a stationary bracket 86 that is fixed to the rake frame. As noted above, the rake wheel arm 64 is pivotally connected to the rake wheel hub at one end, and pivotally connected at a pivot point (hinge 66) to the rake frame at the other end.

The lower arm 82 is approximately the same length as the rake wheel arm 64, and the distance between the pivot point 84 of the stationary bracket 86 and the pivot point (the hinge 66) on the rake frame is approximately the same length as the distance between the pivot points 68 and 80 on the lifting arm 78. This design causes the lower arm to remain in a substantially angularly constant orientation with respect to the rake wheel arm throughout the range of motion of the rake wheel 60, and thus allows the lifting arm to remain in a substantially angularly constant orientation regardless of up and down travel of the rake wheel. Because the gauge wheel shaft 74 is affixed to the lifting arm, it too will retain its substantially vertical orientation throughout this motion.

Because of this linkage 76, as the gauge wheel 70 encounters irregularities in the operating surface 72, it will ride up or down and lift or lower the rake wheel 60 accordingly, regardless of any relative up or down motion of the rake frame 58. The gauge wheel thus provides a positive raising or lowering action to the rake wheel as the machine moves along. The gauge wheel follows the contour of the surface over which the machine moves, and thus the rake wheel likewise follows the contour of the surface over which the machine moves because of the vertical or near vertical force exerted upon it by the action of the gauge wheel. The result is that the operating height H of the rake wheel teeth 62 above the operating surface is maintained substantially constant.

Additionally, throughout the range of motion, the gauge wheel shaft 74 and gauge wheel 70 maintain a substantially vertical orientation because of the parallel linkage 76. This is helpful for maintaining consistent rake wheel height. To allow proper motion, the parallel linkage is disposed in a plane that is substantially parallel to the plane of the rake wheel 60. This is needed to allow the members of the linkage to properly pivot and freely allow the up and down motion of the rake wheel and rake wheel arm.

However, the rake wheel 60 is disposed at an angle with respect to the direction of travel of the raking system 50, while the gauge wheel 70, being configured as a caster, naturally assumes an orientation that is in line with the direction of travel, indicated by arrow 90 in FIG. 4. If the gauge wheel shaft 74 were connected to the rake wheel via some linkage (e.g. a fixed frame) that did not maintain the gauge wheel shaft in its vertical orientation, the gauge wheel would tip to one side or another at various points within the range of vertical motion. Additionally, because the gauge wheel is positioned behind its respective rake wheel, the separation distance between the gauge wheel and the rake wheel would tend to amplify the effect that tipping of the gauge wheel would have on the height of the rake wheel. This tipping would change the vertical distance between the bottom of the gauge wheel and its attachment point on the linkage, and thus vary the intended height of the rake wheel above the ground.

With the present design, in contrast, the gauge wheel 70 maintains a substantially constant vertical and horizontal attitude in relation to the rake wheel and in relation to the rake frame regardless of field surface contours, the rake wheel pivot arm angle, angle of travel or direction of travel.

The structure associated with the gauge wheel 70 includes a height adjustment mechanism 92 for adjusting the height of the gauge wheel with respect to the operating surface 72. This is done by adjusting the height or length of the gauge wheel shaft 74. There are many mechanisms which could be employed for such an adjustment, such as spacers, shims slotted plates, threaded collars, sliding mechanisms, etc. In the embodiment shown in FIG. 4, the gauge wheel shaft includes a plurality of removable depth adjustment spacers 94. By adding or removing spacers, the user can adjust the length of the gauge wheel shaft, and hence adjust the height H of the rake wheel above the operating surface.

One advantageous feature of the present invention is that existing rake wheel systems can be retrofitted with this system. A gauge wheel and parallel linkage as shown in FIGS. 3 and 4 can be added to a conventional rake wheel system as shown in FIGS. 1 and 2 by fixedly attaching the stationary bracket to the rake frame near the pivotal attachment point of the rake wheel arm, and then pivotally attaching the lifting arm to the rake wheel hub. The lifting arm can be attached to an existing rake wheel hub via a split collar that is configured to wrap around the hub and provide a pivotal connection.

Figure 5:
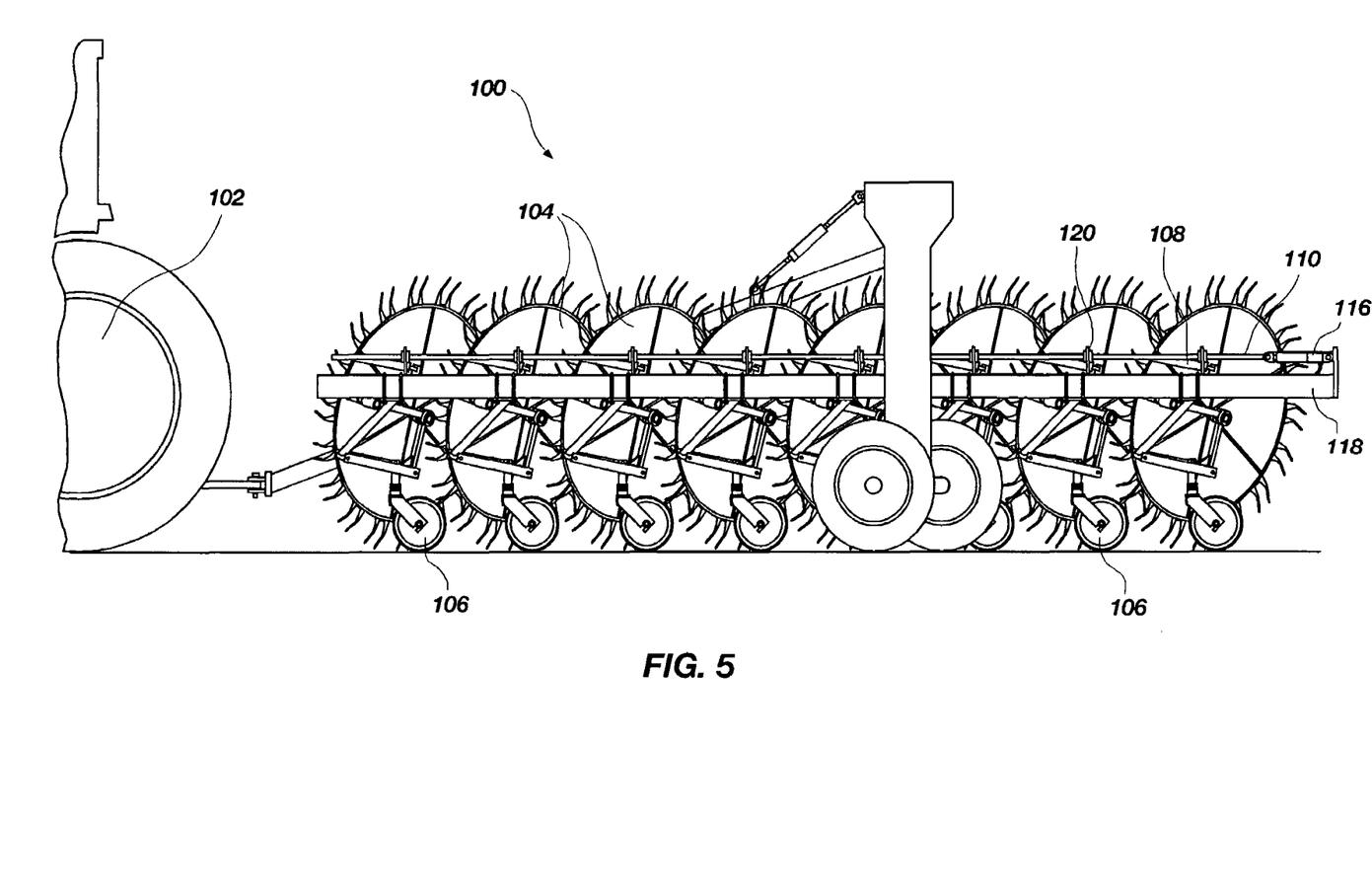
FIG. 5 is an outside view of an alternative embodiment of a wheel raking system in accordance with the present invention.
Figure 6:
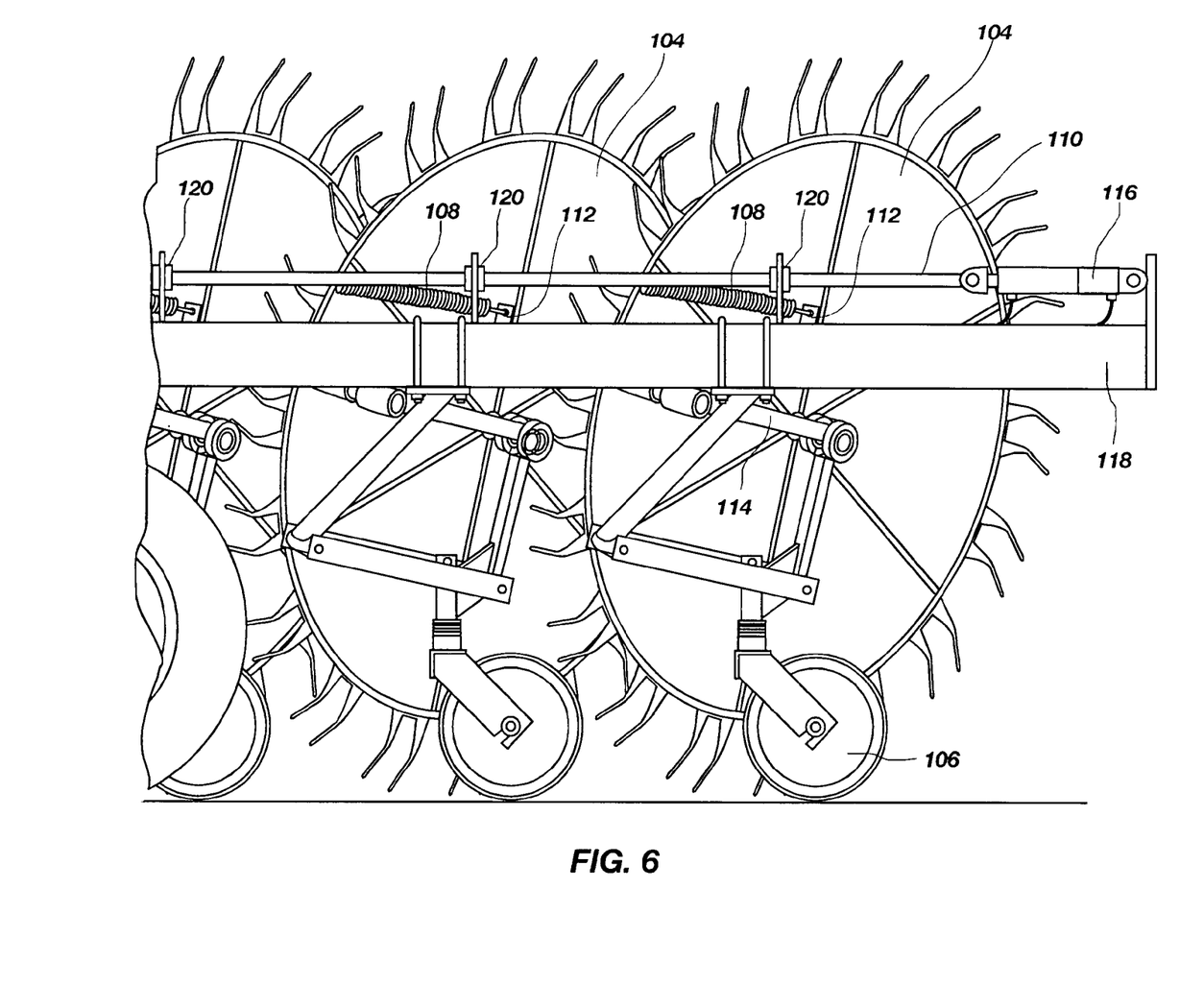
FIG. 6 is a close-up outside view of several rake wheels of the wheel rake system of FIG. 5, showing the gauge wheel and parallel linkage and a biasing spring for maintaining clearance of the rake teeth.

Another embodiment of a hay raking device 100 in accordance with the present invention is depicted in FIGS. 5 and 6. In right side view of FIG. 5 the rake machine is shown being drawn by a typical farm tractor 102 with the rake wheels 104 in a lowered position for field operation. A close-up outside view of several rake wheels and their associated gauge wheels 106 in this embodiment are shown in FIG. 6.

The embodiment of FIGS. 5 and 6 includes the features shown and described above with respect to FIGS. 3 and 4, with the addition of a flexible link 108 and a control shaft 110. The flexible link is attached between the control shaft and a lever arm 112 that is fixedly attached to the rake arm 114. The flexible link and control shaft allow lifting of all of the rake wheels. A hydraulic ram 116 is connected to the control shaft at the rearmost end of the rake wheel carrier beam 118. The control shaft is linearly slidable through a number of stationary supports 120 (e.g. tubes) that are rigidly mounted to the rake wheel carrier beam.

Each rake wheel assembly is connected to the control shaft 110 via the flexible link 108. When the hydraulic ram 116 is extended, the control shaft is pushed forward, and each rake wheel/gauge wheel assembly is raised above the operating position. When the hydraulic ram is retracted, the control shaft slides back, and each rake wheel/gauge wheel assembly is lowered into the operating position shown in FIG. 5. This configuration allows a user to selectively lift all rake wheels when needed, such as for transport, or for turning at the end of a row in the field, then lower them into place for operation of the raking device.

The combination of the control shaft 110 and flexible link 108 can also be configured to help dampen motion of the rake wheel/gauge wheel assembly. Specifically, the flexible link can comprise a flotation spring, as shown in FIGS. 5 and 6. The connection of the flotation spring can be adjustable, so as to provide varying degrees of flotation for the rake wheel/gauge wheel assembly in the operating position. The tension of the flotation spring can be adjusted to increase or decrease the weight carried by the gauge wheel 106 on each rake wheel assembly when the assembly is in the lowered position.

In addition to a spring, other mechanisms can be used for the flexible link 108, such as a cable, a chain, or some other device. Additionally, some hay raking systems include both a flotation spring and a chain or cable acting as a flexible link between the control shaft and the rake wheel arm, and the present invention is compatible with such a configuration. In such systems, the flotation spring can be configured to experience tension only when the rake wheel is in the lowered operating position. In the raised position, substantially all weight from the rake wheel assembly is borne by the flexible link.

Advantageously, because the link between the control shaft 110 and the rake wheel assembly is flexible, each rake wheel/gauge wheel assembly can independently follow the contours of the terrain over which it passes. By virtue of each gauge wheel directly following these contours, the rake teeth mounted on each corresponding rake wheel maintain a relatively consistent height relationship to the terrain. The rake wheel and the gauge wheel move in unison and maintain a relatively consistent relationship to each other whether the machine is traversing uneven terrain and whether these assemblies are in the raised or lowered position.

A gauge wheel and parallel linkage with a wheel-lifting flotation spring assembly as shown in FIGS. 5 and 6 can also be added to an existing wheel rake machine. Many wheel rake systems include a control shaft and flotation springs like those shown in FIGS. 5 and 6. Such a wheel rake system can be modified by attaching the rake wheel to a gauge wheel and parallel linkage having a fixed lever arm attached to the rake wheel arm, as discussed above, and then connecting a flotation spring between the lever arm and control shaft.

Figure 7A:
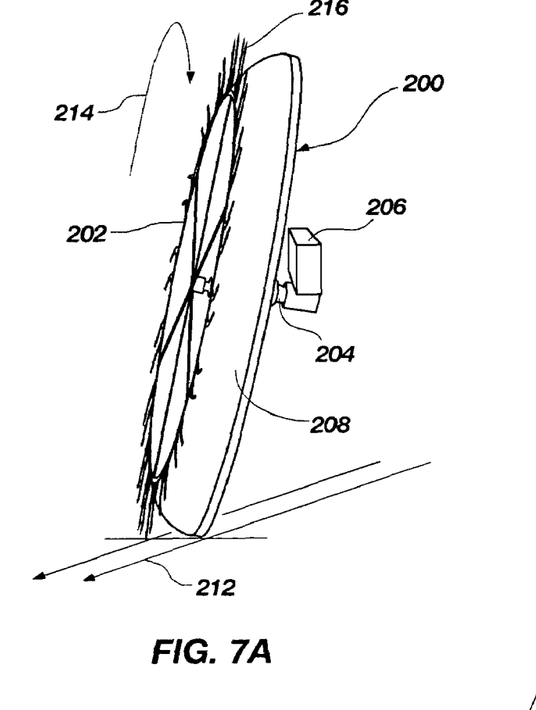
FIGS. 7A and 7B are pictorial views of another embodiment of a rake wheel and large diameter gauge wheel in accordance with the present invention.
Figure 7B:
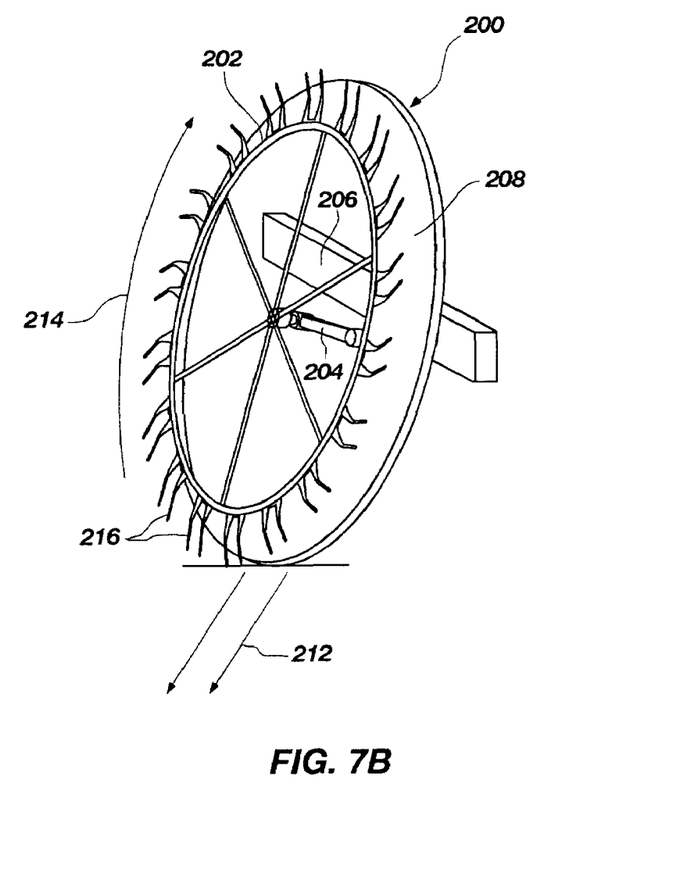

Two additional alternative embodiments of raking systems with gauge wheels are shown in FIGS. 7 and 8. In the embodiment shown in FIGS. 7A and 7B, a large diameter gauge wheel 200 is connected directly around the perimeter of a rake wheel 202 and rotates with the rake wheel and in the same plane. The rake wheel is connected to a rake wheel arm 204, which is pivotally attached to a carrier beam/rake frame 206 like that described above. The large diameter gauge wheel 200 has curved or flared edges 208, somewhat like a bowl or dish. The curvature of the edges of the gauge wheel at the point which it contacts the support surface 210 is generally opposite the direction of travel, indicated by arrows 212. This allows the gauge wheel to easily roll in the direction of arrow 214 (and also slide) over the surface as the wheel rake system is pulled through a field.

The diameter and point of contact of the gauge wheel 200 controls the operating height of the rake teeth 216, and minimizes surface disruption and contamination of the hay or forage with rocks, gravel, soil clods, soil particles, and/or other debris. As noted above, the rake wheel 202 is typically tilted backward slightly (e.g. about 5°), as is evident from FIG. 7A. The rearward flare of the gauge wheel 200, coupled with its diameter and the rearward tilt of the rake wheel causes the point of ground contact of the gauge wheel to trail the effective point of ground contact of the rake wheel by some trailing distance. As with the caster-type gauge wheel, the trailing distance of the point of contact of the gauge wheel can vary, but a trailing distance of about 3" to 12" is anticipated, with a distance of 6" to 10" expected to be most common. Additionally, because of the tilt and rearward flare, the large diameter gauge wheel can have a diameter that is smaller than an outer diameter of the rake wheel, measured at the ends of the rake wheel teeth, and still provide the desired ground clearance height for the rake teeth.

The rake wheel system of FIG. 7 can be easily retrofitted onto existing rake wheel systems. The large diameter gauge wheel 200 is configured to attach to the structure of an existing rake wheel 202, so that the two devices work together as one unit.

Figure 8A:
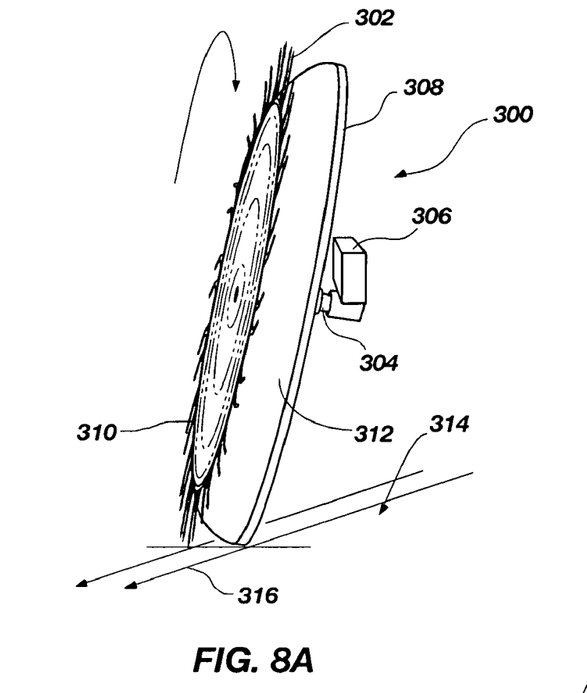
FIGS. 8A and 8B are pictorial views of another embodiment of an integral rake wheel and large diameter gauge wheel in accordance with the present invention.
Figure 8B:
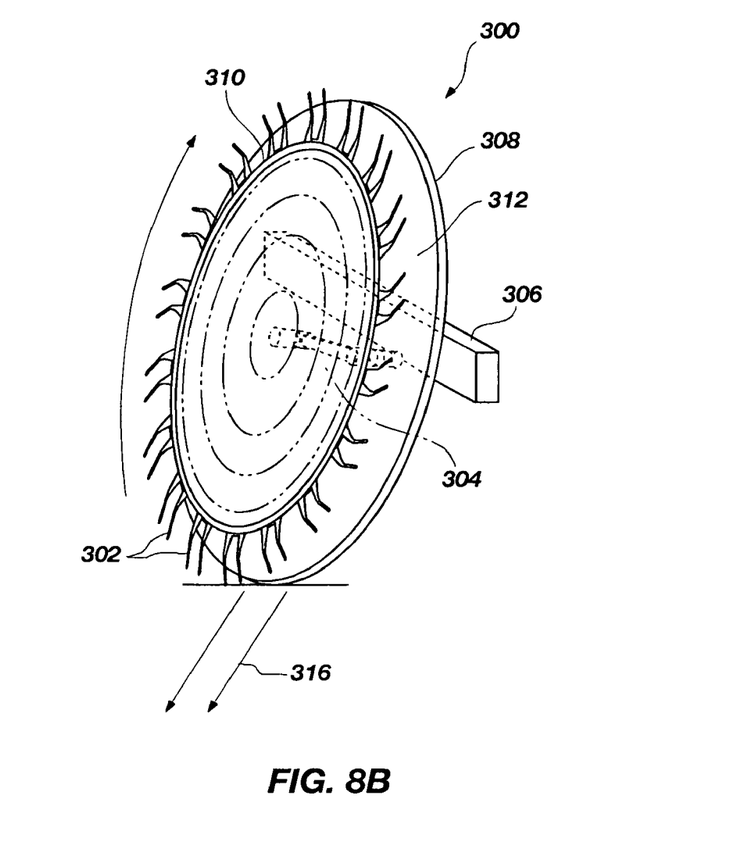

In another alternative embodiment, shown in FIGS. 8A and 8B, a rake wheel and gauge wheel are integrated as a single combined rake wheel/gauge wheel 300 to which rake teeth 302 are directly connected. Like the embodiments discussed above, the integral rake wheel/gauge wheel is attached to a rake wheel arm 304, which is pivotally attached to the carrier beam/rake frame 306. The integral rake wheel/gauge wheel generally comprises a gauge ring portion 308 and a rake teeth portion 310. The gauge ring portion controls the operating height or depth at which the rake teeth will operate in the field. As with the embodiment of FIG. 7, the gauge ring portion includes a rearwardly curved or flared rim 312, that contacts the ground in a trailing position so that the gauge wheel will easily roll and slide over the ground surface 314 when the device is pulled along in the direction of arrows 316.

The curved shape of the integral rake wheel/gauge wheel 300, combined with the height or depth control the gauge wheel provides for the rake teeth and rake wheel, minimizes surface disruption and minimizes contamination of the hay or forage being raked. The integrated gauge wheel/rake wheel can also be added to an existing wheel rake device, though this involves the removal of the original rake wheels and their replacement with the integrated rake wheel/gauge wheel device.

Any of the rake system embodiments disclosed herein can include adjustable rake teeth, which can have their length adjusted independently. This feature allows an operator to adjust the set height or depth at which the rake teeth will operate. Such adjustable rake teeth are currently commercially available for some conventional rake wheels.

The system thus described provides a simple and effective apparatus and method for raking cut hay and/or forage which allows consistent control of the operating height of rake teeth and/or rake wheels on hay rakes used in hay and forage production. The gauge wheel in combination with, or as part of a rake wheel, controls the operating height of each selected rake wheel or group of rake wheels, independent of the running angle, height or attitude of the structural framework of the rake. This raking system and method can be used on one or more rake wheels or on all rake wheels of a given wheel type hay rake unit.

Because the gauge wheel follows the contour of the operating surface, this raking method causes an immediate elevation response in the operating level of the rake wheel and its teeth in relation to ground contour changes as the machine moves along. This method allows the operator to maintain a set operating height or depth relationship between the operating surface and the rake teeth regardless of irregularities in the operating surface. When properly adjusted, this raking method causes very little disruption to the surface over which it passes. The amount and frequency of rocks, gravel, soil clods, soil particles or other debris being dislodged either by the rake teeth or the rake wheel, or by the devices which maintain the proper operating height or depth of the rake wheel, are greatly reduced or eliminated altogether.

The present system also extends rake tooth wear life dramatically because there is little or no contact between the rake teeth and the soil or other surface on which the rake is operating when the system is properly adjusted. This will save significant maintenance costs for the rake itself by prolonging rake tooth life and reducing other wear factors caused by inconsistent raking height or depth. The reduction in rocks, dirt, etc. in the forage will also tend to reduce maintenance costs for machinery used in other production processes which follow raking, such as baling, chopping, cubing, pelletizing, bale compression and repackaging, feed mixing, etc.

This raking system also allows more consistent hay and forage raking operations to be performed by people with lower skill levels because the operating height or depth of rake teeth and/or rake wheels adjusts automatically without the need for additional input or control from the operator. This system and method will help preserve the quality and value of hay and other forages during the raking process by reducing or eliminating contaminants, and will therefore preserve its palatability and feed quality.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A crop raking device, comprising:
  a) a support wheel configured to support a majority of the weight of the crop raking device in relation to the ground;
  b) a rake wheel, configured to rake crop in a field, having teeth disposed around a perimeter thereof, and a vertically variable position;
  c) a gauge wheel, operable with and maintained in a constant position with respect to the rake wheel, configured to contact ground behind the rake wheel and to vertically displace to achieve different elevational positions in response to variations in the surface of the ground; and
  d) a linkage assembly configured to effectuate direct transfer of the different elevational positions of the gauge wheel to the rake wheel to vertically displace the rake wheel an equivalent distance, and to maintain the teeth of the rake wheel above the ground regardless of variations in the surface of the ground.

2. A device in accordance with claim 1, wherein the gauge wheel further comprises:
   a) a caster, configured to trail behind the rake wheel, the linkage, interconnecting the gauge wheel and the rake wheel, the linkage configured to maintain the caster in a substantially constant upright orientation with respect to the rake wheel regardless of a vertical position of the rake wheel.

3. A device in accordance with claim 2, wherein the linkage comprises a parallel arm linkage.

4. A device in accordance with claim 3, further comprising a rake wheel carrier beam, and wherein the parallel arm linkage comprises:
   a) a rake wheel arm, pivotally attached at a first end to the rake wheel carrier beam, and having the rake wheel rotatably attached at a second end via a hub;
   b) a bracket, fixedly attached to the rake wheel carrier beam at a first end thereof;
   c) a lifting arm, pivotally connected to the the rake wheel arm; and
   d) a lower arm, pivotally connected at a lower end of the lifting arm and at a second end of the bracket, the lower arm remaining in a substantially angularly constant orientation with respect to the rake wheel arm throughout a range of motion of the rake wheel, thus allowing the lifting arm to remain in a substantially constant angular orientation with respect to the rake wheel regardless of the vertical displacement of the rake wheel.

5. A device in accordance with claim 1, further comprising a height adjustment mechanism operable with at least one of the gauge wheel, the rake wheel and the linkage assembly, whereby the height of the rake wheel teeth with respect to the ground can be adjusted.

6. A device in accordance with claim 2, wherein the caster is configured to contact the ground at a point a distance of from about 3 inches to about 12 inches behind a nearest point of ground contact of the rake wheel.

7. A device in accordance with claim 1, further comprising a rake wheel carrier beam, and a plurality of rake wheels and gauge wheels, each rake wheel being pivotally attached to the rake wheel carrier beam via a rake wheel arm.

8. A device in accordance with claim 7, wherein the rake wheel carrier beam includes a control shaft, and further comprising a flexible link, attached between each rake arm and the control shaft.

9. A device in accordance with claim 8, wherein the control shaft is selectively linearly displaceable, so as to pull upon each flexible link to lift each of the plurality of rake wheels and their associated gauge wheels to a position above the ground.

10. A device in accordance with claim 8, wherein the flexible link is selected from the group consisting of a flotation spring, a chain, a cable and any combination of these.

11. A device in accordance with claim 1, wherein the gauge wheel comprises a rim, rearwardly concentrically extending from near a perimeter of the rake wheel and configured to rotate therewith, and to contact the ground rearwardly of the rake wheel.

12. A device in accordance with claim 11, wherein the rim comprises a rearwardly flared portion.

13. A device in accordance with claim 11, wherein the gauge wheel comprises a rim that is attached to an outer rim of the rake wheel.

14. A device in accordance with claim 11, wherein the gauge wheel comprises an integral rake wheel and rearwardly flared rim.

15. A device in accordance with claim 11, wherein the rim is configured to contact the ground at a point a distance of from about 3 inches to about 12 inches behind a nearest point of ground contact of the rake wheel.

16. A hay rake, comprising:
   a) a rake wheel carrier beam, configured to be drawn across an operating surface in a raking direction;
   b) a support wheel configured to support the rake wheel carrier beam in relation to the ground;
   c) a plurality of rake wheel arms, pivotally attached to the rake wheel carrier beam;
   d) a plurality of rake wheels, having a plurality of teeth, each rake wheel being rotatably attached via a hub to one of the plurality of rake wheel arms;
   e) a plurality of gauge wheels, each interconnected to one of the plurality of rake wheels, configured to roll upon the operating surface behind the associated rake wheel, and to maintain the associated rake wheel at a selected, consistent height relative to and above the operating surface; and
   f) a plurality of pivoting linkages, each interconnected between the rake frame and the rake wheel hubs, and gauge wheel associated with one of the plurality of rake wheels, the pivoting linkage being configured to allow the gauge wheel to displace vertically in response to irregularities in the operating surface while maintaining the gauge wheel in a substantially constant orientation with respect to the rake wheel, and to effectuate direct transfer of one or more different elevational positions of the gauge wheel to the rake wheel to vertically displace the rake wheel an equivalent distance, and to maintain the teeth of the rake wheel above the operating surface regardless of variations in the operating surface.

17. A hay rake in accordance with claim 16, further comprising:
   a) a moveable control shaft, associated with the rake wheel carrier beam; and
   b) a flexible link, attached between each rake wheel arm and the control shaft, the control shaft being selectively linearly displaceable, so as to pull upon each flexible link to lift each of the plurality of rake wheels and their associated gauge wheels to a position above the operating surface.

18. A crop raking device, comprising:
   a) a support wheel configured to support a majority of the weight of the crop raking device in relation to the ground;
   b) a rake wheel, having a plurality of teeth disposed around a perimeter thereof, configured for raking a crop, and having a vertically variable position;
   c) a gauge wheel, operable with the rake wheel, configured to contact a ground surface behind the rake wheel, and to maintain a consistent height of the rake wheel teeth above the ground; and
   d) means for maintaining a constant orientation of the gauge wheel with respect to the rake wheel, and for transferring one or more different elevational positions of the gauge wheel to the rake wheel to vertically displace the rake wheel an equivalent distance, and to maintain the teeth of the rake wheel above the operating surface despite variations in the vertical position of the rake wheel in response to variations in the ground surface.

19. A crop raking device in accordance with claim 18, wherein the means for maintaining a constant orientation of the gauge wheel comprises a pivoting linkage, interconnecting the gauge wheel to the rake wheel.

20. A crop raking device in accordance with claim 18, wherein the gauge wheel comprises a caster, configured to trail behind the rake wheel and contact the ground a trailing distance behind the rake wheel.

21. A crop raking device in accordance with claim 18, wherein the gauge wheel comprises a rim, rearwardly concentrically extending from a perimeter of the rake wheel and configured to rotate therewith, and to contact the ground a trailing distance behind the rake wheel.

22. A crop raking device, comprising:
   a rake mainframe;
   a support wheel adapted to support the rake mainframe in relation to the ground;
   a rake wheel configured to rake crop in a field, the rake wheel having teeth disposed around a perimeter thereof, the rake wheel also having a vertically variable operating position above the ground and in relation to the rake mainframe;
   a gauge wheel configured to be lowered into an operating position in contact with the ground, and configured to vertically displace to achieve different elevational positions in response to changes in surface topography of the ground; and
   a linkage assembly interconnecting the mainframe, the rake wheel and the gauge wheel, wherein the linkage assembly transfers the elevation changes of the gauge wheel to the rake wheel to vertically displace the rake wheel an equivalent, corresponding distance, independent of a vertical position of the rake mainframe, to maintain the teeth of the rake wheel above the ground regardless of variations in the surface of the ground.

23. The crop raking device of claim 22, wherein a sufficient weight of the rake wheel is borne by the gauge wheel to maintain the gauge wheel in contact with the ground during operation, and to effectuate the transfer of the elevation changes of the gauge wheel to the rake wheel.

24. The crop raking device of claim 22, wherein the support wheel operates to control the trailing direction of travel of the raking device.

25. The crop raking device of claim 24, wherein the gauge wheels are configured to comprise a caster, and to pivot about a vertical axis to cause the gauge wheel to follow the trailing direction of travel of the raking device.

26. The crop raking device of claim 22, wherein the rake wheel, the gauge wheel and the linkage assembly are all at least partially supported by the mainframe.

27. The crop raking device of claim 22, wherein the rake wheel is configured to rotate and operate upon coming in contact with a crop rather than the ground.

28. The crop raking device of claim 22, further comprising a plurality of rake wheels that operate with at least one gauge wheel.

29. The crop raking device of claim 22, further comprising a plurality of rake wheels, each of which operate with a corresponding gauge wheel, wherein each rake wheel and gauge wheel combination is and operates independent of the other rake wheel and gauge wheel combinations.

30. The crop raking device of claim 22, wherein the rake mainframe comprises:
   a primary support frame;
   at least one rake wheel carrier beam pivotally coupled the primary support frame; and
   means for operably coupling the support wheel to the rake mainframe.

31. The crop raking device of claim 30, further comprising a frame component adapted for use with a towing vehicle or traction unit.

* * * * *